United States Patent
Bass et al.

(10) Patent No.: US 9,098,582 B1
(45) Date of Patent: Aug. 4, 2015

(54) IDENTIFYING RELEVANT DOCUMENT LANGUAGES THROUGH LINK CONTEXT

(75) Inventors: Derrick E. Bass, Mountain View, CA (US); Xin Liu, San Jose, CA (US); Matteo Slanina, Menlo Park, CA (US); Trystan Upstill, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1486 days.

(21) Appl. No.: 12/421,931

(22) Filed: Apr. 10, 2009

(51) Int. Cl.
*G06F 17/30* (2006.01)

(52) U.S. Cl.
CPC .................. *G06F 17/30864* (2013.01)

(58) Field of Classification Search
CPC .......... G06F 17/30864; G06F 17/3053; G06F 17/30684; G06F 17/30867; G06F 17/3089; G06F 17/30598; G06F 17/30861; G06F 17/2247; G06F 17/28; G06F 17/30011; G06F 17/30126
USPC .................................................. 707/726, 749
See application file for complete search history.

(56) References Cited

U.S. PATENT DOCUMENTS

| | | | |
|---|---|---|---|
| 5,920,859 A * | 7/1999 | Li | 715/205 |
| 6,285,999 B1 | 9/2001 | Page | |
| 7,451,130 B2 | 11/2008 | Gupta et al. | |
| 7,711,732 B2 * | 5/2010 | Pedersen et al. | 707/726 |
| 7,779,001 B2 * | 8/2010 | Zeng et al. | 707/726 |
| 2002/0002452 A1 * | 1/2002 | Christy et al. | 704/3 |
| 2004/0194099 A1 | 9/2004 | Lamping et al. | |
| 2005/0125440 A1 * | 6/2005 | Hirst | 707/103 R |
| 2006/0294100 A1 * | 12/2006 | Meyerzon et al. | 707/7 |
| 2008/0059566 A1 * | 3/2008 | Korovkin et al. | 709/203 |
| 2008/0195596 A1 * | 8/2008 | Sisk et al. | 707/5 |

OTHER PUBLICATIONS

Toyoda, Masashi, and Masaru Kitsuregawa. "Creating a Web community chart for navigating related communities." Proceedings of the 12th ACM conference on Hypertext and Hypermedia. ACM, 2001.*
Bizer, Christian, et al. "DBpedia-A crystallization point for the Web of Data."Web Semantics: science, services and agents on the world wide web 7.3 (2009): 154-165.*
Duhan, Neelam, A. K. Sharma, and Komal Kumar Bhatia. "Page ranking algorithms: a survey." Advance Computing Conference, 2009. IACC 2009. IEEE International. IEEE, 2009.*
U.S. Appl. No. 11/737,603, filed Apr. 19, 2007, Liu et al.

* cited by examiner

*Primary Examiner* — Usmaan Saeed
*Assistant Examiner* — Nan Hutton
(74) *Attorney, Agent, or Firm* — Fish & Richardson P.C.

(57) ABSTRACT

Methods, systems, and apparatus, including computer program products, for identifying languages that are relevant to resource. In an aspect, language features are identified for incoming resource links to a resource and outgoing resource links from the resource. The language features or use by a language classification model to generate language relevance scores. The language relevance scores for each of the incoming resource links and outgoing resource links are used to generate a corresponding relevance measure for each of a plurality of languages. Each relevance measure is a measure of the relevance of the language to the resource.

21 Claims, 7 Drawing Sheets

IDENTIFYING RELEVANT DOCUMENT LANGUAGES THROUGH LINK CONTEXT

BACKGROUND

This specification relates to digital data processing, and particularly to processing resources to identify languages that are relevant to the resources.

The Internet provides access to a wide variety of resources, for example, video or audio files, web pages for particular subjects, book articles, and news articles. Because the Internet connects all parts of the world, the resources' content are usually expressed in many different languages. Consequently, systems have been developed to determine the language in which a particular resource is written. These systems process the content of a resource, e.g., the text of the resource and/or the encoding of the text of the resource, to determine the language of the resource.

Determining a language of a resource is especially useful for search engine processing. A search engine selects resources in response to a user query that includes one or more search terms or phrases, and ranks the resources based on their relevance to the query and importance. When language data that specifies the language of a resource is available to the search engine, the search engine can use the language data in a relevance calculation. For example, a resource written in French will be more relevant to a query written in French that would a similar resource written in English, and thus the French resource will usually be ranked higher than the English resource.

A resource written in a particular language, however, may be of interest to users of different languages. Thus, systems have also been developed to identify the languages that are relevant to a resource. One example system determines relevant languages for a resource by associating with each incoming resource link to the resource a language of the content of the source resource of the link. For example, a web page may be the target of five resource links from five different source web pages. For each resource link pointing to the web page, the language of the content (e.g., text) of the source web page that includes the resource link is determined and associated with the resource link. If a percentage of all incoming resource links associated with the same language exceeds a threshold percentage, then the language is determined to be relevant for that resource.

Often, however, it is difficult to detect precisely the language of the resource or the languages that are relevant to the resource. Many resources have an insufficient amount of text or other content for conventional content-based language identification methods. For example, a fully framed website may contain no text on the home page, thus hindering conventional content-based language identification methods. Likewise, the home page of the web site may be the target of several incoming resource links, and each of the resource links may be associated with a different language. Thus, relevant languages may not be accurately determined from the incoming resource links.

Additionally, a resource can include text in many different languages. The presence of text in many different languages in the resource, however, does not necessarily mean that the resource is relevant to all of those languages.

SUMMARY

In general, one aspect of the subject matter described in this specification can be embodied in methods that include the actions of selecting a first resource having a corresponding resource address and being linked to other resources by incoming resource links and outgoing resource links, each incoming resource link being a resource link that links to the first resource from a corresponding source resource, and each outgoing resource link being a resource link that links to a corresponding target resource from the first resource; generating one or more language relevance scores for each of the incoming resource links and outgoing resource links from data defining the incoming resource links and the outgoing resource links, each of the language relevance scores representing a relevance of a corresponding language to the first resource; identifying one or more languages as being relevant to the first resource from the language relevance scores; and associating with the resource in a resource index the one or more languages identified as being relevant to the first resource. Other embodiments of this aspect include corresponding systems, apparatus, and computer program products.

Another aspect of the subject matter described in this specification can be embodied in methods that include the actions of selecting a first resource having a corresponding resource address and being linked to other resources by incoming resource links and outgoing resource links, each incoming resource link being a resource link that links to the first resource from a corresponding source resource, and each outgoing resource link being a resource link that links to a corresponding target resource from the first resource; generating language relevance scores for each of the incoming resource links and outgoing resource links from data defining the incoming resource links and the outgoing resource links, each of the language relevance scores representing a relevance of a corresponding language to the first resource; generating relevant language data from the language relevance scores, the relevant language data being data that measures the relevance to the first resource to the corresponding languages; and associating the relevant language data with the first resource in a resource index. Other embodiments of this aspect include corresponding systems, apparatus, and computer program products.

Particular embodiments of the subject matter described in this specification can be implemented to realize one or more of the following advantages. Relevant languages can be identified for resources that do not include textual content, such as web pages that include only images.

Multiple relevant languages can be identified for a resource, and the number of languages that are identified can be independent of the number of incoming and outgoing links.

A resource link may have different language relevance scores for its corresponding source page and target page, and thus the relevant languages are contextually determined for each resource from a context defined by incoming links and outgoing links relative to resource.

Resources can be classified as language gateway resources from an analysis of incoming and outgoing resource links. The language relevance scores of an incoming resource link are increased if the source page of the incoming resource link is a language gateway resource.

The language relevance scores for resource links that have a common source feature, e.g., incoming resource links to a resource that are each from the same web site, same domain, or same web page can be limited so that no one group of resource links disproportionately affects the identification of languages that are relevant to a resource.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
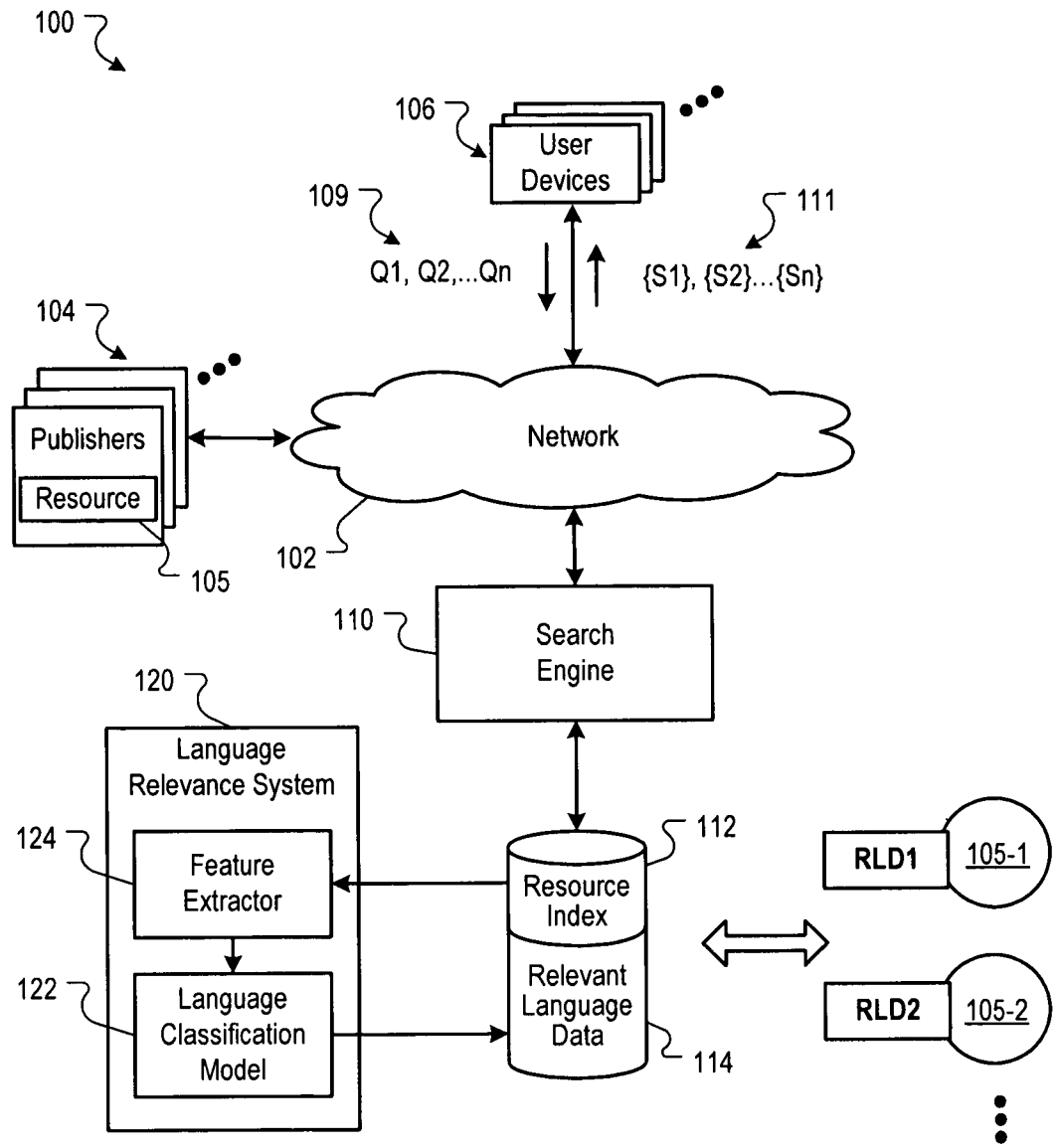
FIG. 1 is a block diagram of an example environment in which a language relevance system can be used.

FIG. 1 is a block diagram of an example environment in which a language relevance system can be used. A computer network 102, such as a local area network (LAN), wide area network (WAN), the Internet, or a combination thereof, connects publishers 104, user devices 106, and a search engine 110. The online environment 100 may include many thousands of publishers 104 and user devices 106.

A publisher 104 is any web site that hosts and provides electronic access to a resource by use of the network 102. A web site is one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 104 over the network 102 and that is associated with a resource address. Resources include HTML pages, word processing documents, and portable document format (PDF) documents, images, video, and feed sources, to name just a few. The resources includes content, such as words, phrases, pictures, and so on, and may include embedded information (such as meta information and hyperlinks) and/or embedded instructions (such as JavaScript scripts).

Each resource has an addressable storage location that can be uniquely identified. The addressable location is addressed by a resource locator, such as a universal resource locator (URL). Each resource can reference another resource by use of a resource link. An example resource link is a hypertext markup language (HTML) hyperlink that references another resource by the URL of the resource, or an Xlink in an extensible markup language (XML) document.

Whether a resource link is an incoming resource link or an outgoing resource link depends on the context of the resource link relative to a resource. For example, for a first resource, an outgoing resource link is a resource link in the first resource that addresses a second resource at a URL that is different from the URL of the first resource. For the outgoing resource link, the first resource can be referred to as a "source resource", and the second resource can be referred to as a "target resource." Similarly, an incoming resource link to the first resource is a resource link in a second resource that addresses the first resource. For the incoming resource link, the first resource can be referred to as the "target resource" and the second resource can be referred to as the "source resource."

The resource link may have visible text, such as anchor text, that is visibly distinguished from other text in the resource when rendered on a user device 106. For example, anchor text is often underlined and rendered in a different color to distinguish it from the other text in the resource. Selecting the anchor text, i.e., clicking on the anchor text, causes the user device to request the resource addressed by the URL that is embedded in the resource link.

A resource link can also be associated with an area in an image map (a "hot link") or be an in-line link. Hot links and in-line links do not necessarily have visible text.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

As there are many thousands of publishers, there are millions of resources 105 available over the network 102. To facilitate searching of these resources, the search engine 110 identifies the resources by crawling the publishers 104 and indexing the resources provided by the publishers 104. The indexed and, optionally, cached copies of the resources are stored in a resource index 112.

The user devices 106 submit search queries 109 to the search engine 110. In response, the search engine 110 uses the resource index 112 to identify resources that are relevant to the queries. The search engine 110 identifies the resources in the form of search results 111 and returns the search results 111 to the user devices 106 in search results pages. A search result 111 is data generated by the search engine 110 that identifies a resource that satisfies a particular search query, and includes a resource locator for the resource. An example search result 111 can include a web page title, a snippet of text extracted from the web page, and the URL of the web page. The URL can be provided in the form of a resource link to the web page.

One example search engine is the Google™ search engine provided by Google Inc. of Mountain View, Calif., U.S.A. The search results are ranked based on scores related to the resources identified by the search results, such as information retrieval ("IR") scores, and optionally a separate ranking of each resource relative to other resources ("page rank"). In some implementations, the IR scores are computed from dot products of feature vectors corresponding to a query and a resource, and the ranking of the search results is based on relevance scores that are a combination of the IR scores and page rank scores. The search results 111 are ordered according to these relevance scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher 104 hosting the resource receives the request for the resource from the user device 106 and provides the resource to the requesting user device 106.

There are many features that the search engine 110 can use when determining the relevance of the resource to a query. Among these features is the relevance of a language to the resource. As described above, the relevance of a language can be used to determine the overall relevance of a resource to a query. Accordingly, a language relevance system 120 is used to determine the relevance of languages to resources, and to identify languages that are relevant to the resources. The language relevance system 120 processes incoming and outgoing links for a resource to identify languages that are relevant to the resource.

In some implementations, the language relevance system 120 traverses a link-graph for the resource being processed when identifying languages of interest for the resource, as described in more detail with reference to FIGS. 2A and 2B below. For example, source resources that are the source of incoming links to the resource and target resources that are the targets of the outgoing links from the resource can be processed to identify languages that are relevant to the resource.

The system 120 generates language relevance scores for each of the incoming resource links and outgoing resource links for a resource. Each of the language relevance scores represents a relevance of a corresponding language to the resource. The language relevance scores for each resource link can be representative of "votes" of language relevance for the resource.

The language relevance system 120 then process all of the language relevance scores for all of the resource links for a resource to generate relevant language data 114 from the language relevance scores. The relevant language data 114 are data that measure the relevance of the languages to the resource. In some implementations, the relevant language data 114 for each resource are stored in the resource index 112 and associated with their corresponding resource. Accordingly, by accessing the resource index 112, the search engine 110 can identify the relevance of languages to corresponding resources.

For example, the resource 105-1 can be associated with relevant language data 114 RLD1, and the resource 105-2 can be associated with relevant language data 114 RLD2, and so on. The relevant language data 114 can, in some implementations, be a language relevance vector that includes plurality of relevance measures S corresponding to a plurality of languages, e.g., RLD=S1, S2, S3 . . . Sq. For example, if the relevance measures correspond to probabilities that a language is relevant to a resource, an example vector of relevant language data for the languages of German, French, English, Russian and Japanese can be:

RLD=[0.1, 0.82, 0.92, 0.04, 0.03]

The example vector above indicates that the resource is likely very relevant to the languages of French and English, as represented by the respective relevance measures of 0.82 and 0.92, and is unlikely to be relevant to the languages of German, Russian and Japanese, as indicated by the respective relevance measures of 0.1, 0.04 and 0.03.

Different relevance measures can be used, depending upon the implementation. For example, the relevance measures can range from negative values to positive values, or the relevance measures can be binary values that indicate whether the language relevance system 120 has determined that a language is relevant to a resource or is not relevant to a resource. Other relevance measures can also be used.

In some implementations, the language relevance system 120 identifies language features for resource links that are input to a language classification model 122 that generates the relevance measures. The language classification model 122 can generate languages relevance scores from language features based on weights for the language features. Weights for the language features can be deduced from machine learning over a corpus of documents with known relevant languages, or set empirically through logistical regression, as described in more detail below. Example language features include the language of anchor text for a link; whether a link is incoming or outgoing from a resource; the language of the resource; the languages of the source and target resources; whether the resource is a language gateway resource; and whether a source resource for a resource link is a language gateway resource. These language features and additional language features are described in more detail below.

Figure 2A:
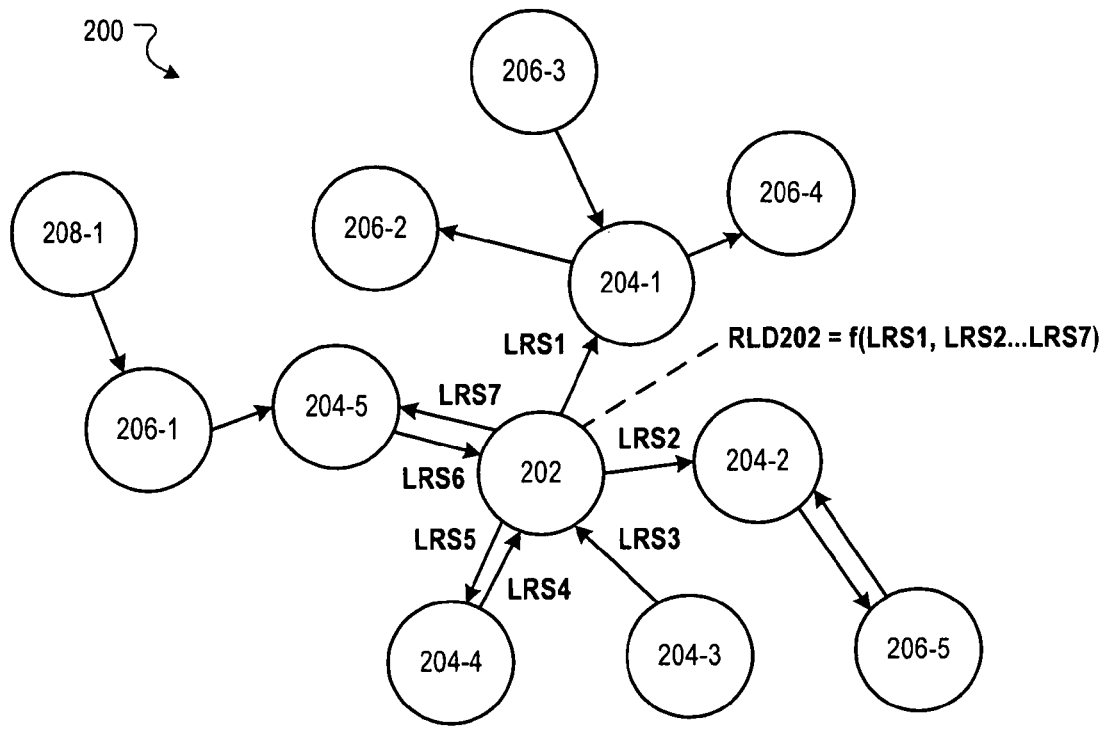
FIG. 2A is an illustration of an example link graph.

FIG. 2A is an illustration of an example link graph 200. In some implementations, the resources are represented as nodes in a link graph, and the incoming resource links and outgoing resource links for each node are represented as edges in the link graph. The relevance of languages to a resource is determined according to the context of the resource in the link graph 200.

For example, to determine the relevance of languages to the resource 202, the language relevance system 120 selects the resource 202, and generates language relevance scores for each of the incoming resource links to the resource 202 and outgoing resource links from the resource 202. As depicted in FIG. 2A, the resource 202 has four outgoing resource links and three incoming resource links. Each of the seven resource links has an associated set of language relevance scores LRS1, LRS2 . . . LRS7.

In some implementations, the language relevance scores are a language relevance vector that includes plurality of relevance measures S corresponding to a plurality of languages, e.g., LRSn=S1, S2, S3 . . . Sq.

Each relevance measure measures the relevance of its corresponding language to the resource. Different relevance measures can be used, depending upon implementation. For example, the relevance measures can be probabilities that a corresponding language is relevant to the resource; the relevance measures can range from negative values positive values; or the relevance measures can be binary values that indicate whether the language relevance system 120 has determined that a language is relevant to a resource or is not relevant to a resource. Other relevance measures can also be used.

Furthermore, the relevance measures used for the language relevance scores LRS need not be the same as the relevance measures used for the relevant language data RLD. For example, the relevance measures used for the language relevance scores LRS can be binary values, and the relevance measures used for the relevant language data RLD can be conditional probabilities based on the given relevancies indicated by the language relevance scores.

To generate a language relevance score for each of the incoming resource links and outgoing resource links, the language relevance system 120 can use data defining the incoming resource links and the outgoing resource links. Examples of such data include language indicators in the resource links. A language indicator is data that indicates a particular language associated with the resource link. The anchor text of the resource link can indicate a language by either the language of the anchor text and/or by specifically listing the language in the anchor text. For example, the anchor text of an outgoing resource link linking to a target resource may read "English Version," indicating that the outgoing resource link references a target resource that is an English version of the source resource.

By way of another example, the URL of the outgoing resource link may include a country code that specifies a language specific host. Language specific hosts are often identified by language codes, such as "en" for English (en.example.com), "jp" for Japanese (jp.example.com), and "ru" for Russian (ru.example.com).

The language relevance system 120 determines the language relevance scores for each resource link in a context of incoming links and outgoing links relative to resource. For example, in the context of the resource 202, the resource link to the resource 204-1 is an outgoing resource link; conversely, in the context of resource 204-1, the resource link from the resource 202 is an incoming resource link.

The language relevance scores associated with the resource link vary with respect to whether the resource link is an incoming resource link or an outgoing resource link. For example, assume the language relevance system 120 is measuring the relevance of languages to the resource 202. If the resource link between the resources 202 and 204-1 includes the anchor text "English version of this page," or "Version anglaise de cette page," then a language relevance score for English for the resource link may be relatively low, as the anchor text "English version of this page" or "Version anglaise de cette page," can be interpreted as a signal that the resource 202 is not written in the English language, or would not be of primary interest to readers of English language. Conversely, when measuring the relevance of languages to the resource 204-1, the language relevance system 120 may generate a relatively high language relevance score for English for the resource link.

In addition to using data defining the incoming resource links to the resource 202 and the outgoing resource links from the resource 202, the language relevance system 120 can also use other features associated with each resource link. Such other features include the target content language of a target resource for an outgoing resource link, and the source content language of the source resource for an incoming resource link. For example, assume that the source resource 202 is data that defines an image map with outgoing resource links associated with areas on the image map, and does not include any text. If the content language of a corresponding target resource of an outgoing resource link is in English, then the language relevance system 120 can generate a relatively high language relevance score for English for the outgoing resource link.

The language relevance system 120 generates the language relevance scores from language features of each of the incoming resource links to the resource 202 and the language features of each of the outgoing resource links from the resource 202. In some implementations, a language classification model 122 receives the language features as input to generate the language relevance scores for each of the incoming resource links and outgoing resource links.

A feature extractor 124 is used to identify the language features that are present in each of the resource links. A feature extractor 124 is software program programmed to identify the presence or absence of particular features for resource link. For example, the feature extractor can identify, for each resource link, features such as the URL of the resource link, country geographic codes associated with the URL, whether the resource link includes anchor text and if so the language of the anchor text, the content language of target resources or source resources for respective outgoing resource links and incoming resource links, to name just a few.

Another feature that the feature extractor 124 can identify is common source features for resource links. Resource links have a common source feature when the sources for the resource links are each from the same web site, same domain or same resource. The common source feature can be used to limit the relevance scores of its corresponding resource links so that no one group of resource links disproportionately affects the identification of languages that are relevant to a resource.

Figure 2B:
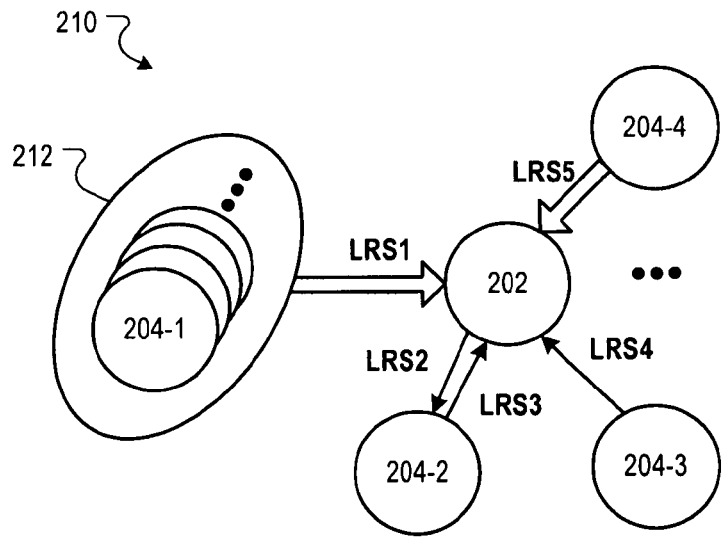
FIG. 2B is an illustration of an example link graph in which incoming resource links from a site contribute language relevance scores to a resource.

This concept is better understood with reference to FIG. 2B, which is an illustration of an example link graph in which incoming resource links from a site 212 contribute language relevance scores to a resource 202. For example, the site 212 may have a number of web pages, and each web page may include multiple resource links to the resource 202. The total number of incoming resource links from the website 212 may be a large percentage of all incoming resource links to the resource 202. In some implementations, the language relevance scores for all the incoming links from the website 212 may be represented as a single set of language relevance scores for an incoming resource link. By doing so, the language relevance system 120 minimizes a disproportionate effect that may occur if language relevance scores for each of the incoming resource links from the website 212 are generated separately.

A similar process can be used for each individual resource. For example, the resource 204-4 may be a source resource for a dozen incoming links to the resource 202. Accordingly, only one set of language relevance scores for the incoming resource links from the resource 204-4 is generated.

Once the language relevance scores for all incoming links and outgoing links for the resource 202 are generated, the language relevance system 120 uses the language relevance scores to generate the relevant language data for the resource 202. For example, the language classification model 122 can use a summation function of the language relevance scores to generate the relevant language data. In other implementations, the language classification model 122 can use a multiplication of the language relevance scores to generate the relevant language data. In still other implementations, the language classification model can use conditional probability functions to generate the relevant language data. Other functions can also be used, depending on the scoring system implemented, and as indicated by the generalized function RLD202=f(LRS1, LRS2 . . . LRS7) of FIG. 2A.

A variety of models and learning methods can be used for building language classification models. In some implementations, weights for language features of the resource links can be deduced by machine learning over the training and test corpus of documents using a Naïve Bayes classifier or support vector machine. In other implementations, weights can be set empirically through logistic regression.

For example, the language classification model 122 can be a machine-learned model that is trained using training and testing data. The training data and testing data are resources, e.g., web pages, for which relevant languages have been determined by human evaluators. The machine-learned model can use one of many known supervised learning methods. For example, a feature set corresponding to the language of anchor text in a resource link, the content language of source resources for incoming links and target resources for outgoing links, and common source characteristics for resource links can be defined for training the machine-learned model on the training data. Once the model is trained with a corresponding set of language feature weights, the model is tested on the testing data. The training and testing process continues until the model estimates the relevance of languages to the resources the testing set to an acceptable degree of accuracy. Once the language feature weights are set, they are stored in the language classification model 122.

By way of another example, the language feature weights are established by evaluators and not established by a machine-learning process. For example, evaluators can establish weights for a logistic regression model.

In some implementations, the language relevance scores for each resource link for a first resource can be determined, in part, from the relevant language data of their corresponding target pages or source pages. For example, with respect to FIG. 2A, the language relevance system 120 can traverse several nodes relative to the node corresponding to the resource tool to in the link graph 200 and determine relevant language data for the resource that are directly linked to or from the resource 202, i.e., the resources corresponding to nodes 204-1 . . . 204-5, and for additional resources up to several nodes away in the link graph, i.e., nodes 206-1 . . . 206-5, and node 208-1. The link graph can be iteratively traversed several times using a link graph traversal algorithm.

In some implementations, a link quality of a link can also be considered as a language feature in determining the language relevance scores. A link quality of a link can be determined from features such the link being part of a "boilerplate" section of a resource that is included in many other resources; the font size of anchor text of the link; the position of the link in the rendered resource; the importance of the resource; and whether the link has an associated "no follow" command for crawling agents, to name just a few. These features can either be provided to the feature extractor 124 from other processing systems associated with the search engine 110, or the feature extractor 124 can be further configured to identify these features.

For example, to determine whether a link is part of a "boilerplate" section of a resource, the feature extractor 124 can compare the HTML source of the resource to the HTML source of other resources hosted by the same host or associated with the same domain. A set of the same links being present in the same frame in a large percentage of the resources for a web site will be classified as boilerplate links. In implementations in which the language relevance scores are non-binary scores, the feature extractor 124 can be configured to reduce the language relevance scores of boilerplate links relative to the language relevance scores of non-boilerplate links. The reduction can be a predefined percentage, or some other reduction factor. In another implementation, the feature extractor 124 can be configured to reduce the impact on the resource link's overall contribution to the relevant language data. This latter implementation can be used for either binary or non-binary language relevance scores.

With respect to font size and position, the feature extractor 124 is configured to increase the language relevance scores of links with large fonts and links that are displayed near the top of a rendered resource relative to the language relevance scores of links with small fonts or links that are displayed in footers or near the bottom of the resource. Alternatively, the feature extractor 124 can be configured to increase the impact on the resource link's overall contribution to the resulting relevant language data.

With respect to importance of a resource, the importance of source resources and target resources can also be taken into consideration when determining the language relevance scores and the relevant language data for a first resource. For example, language relevance scores for incoming resource links to the first resource from source resources that are ranked high in importance can be increased relative to language relevance scores for incoming resource links to the first resource from source resources that are ranked low in importance. Likewise, language relevance scores for outgoing resource links from the first resource to target resources that are ranked high in importance can be increased relative to language relevance scores for outgoing resource links from the first resource to target resources that are ranked low in importance. Alternatively, the feature extractor 124 can cause an increase or decrease in the impact of the resource link's overall contribution to the resulting relevant language data.

With respect to "no follow" commands, the language relevance score of such links can be ignored, or otherwise adjusted to some null values or other values to indicate no relevance for any particular language.

Another feature that is relevant to determining language relevance scores is whether the resource links are associated with the language gateway resource. A characteristic of language gateway resources is the inclusion of outgoing resource links to many other target resources in many different languages, and being a target of incoming resource links from source resources in many different languages. A language gateway resource is often used as a top-level resource of site that includes duplicates of resources in different languages, e.g., a website that includes corresponding sets of web pages in English, French, German, Japanese, and so on.

The language relevance system 120 identifies a resource as a language gateway resource if the language relevance scores for the incoming resource links indicate at least first threshold number of languages that are relevant to the resource and the language relevance scores for the outgoing resource links indicate at least second threshold number of languages that are relevant to the resource. In some implementations, the language relevance system 120 identifies a language as relevant to the resource for a resource link if the language relevance score exceeds a threshold value, e.g., greater than 80% if the language relevance scores are probability values, or greater than some other value if the language relevance scores are not probability values.

Figure 3A:
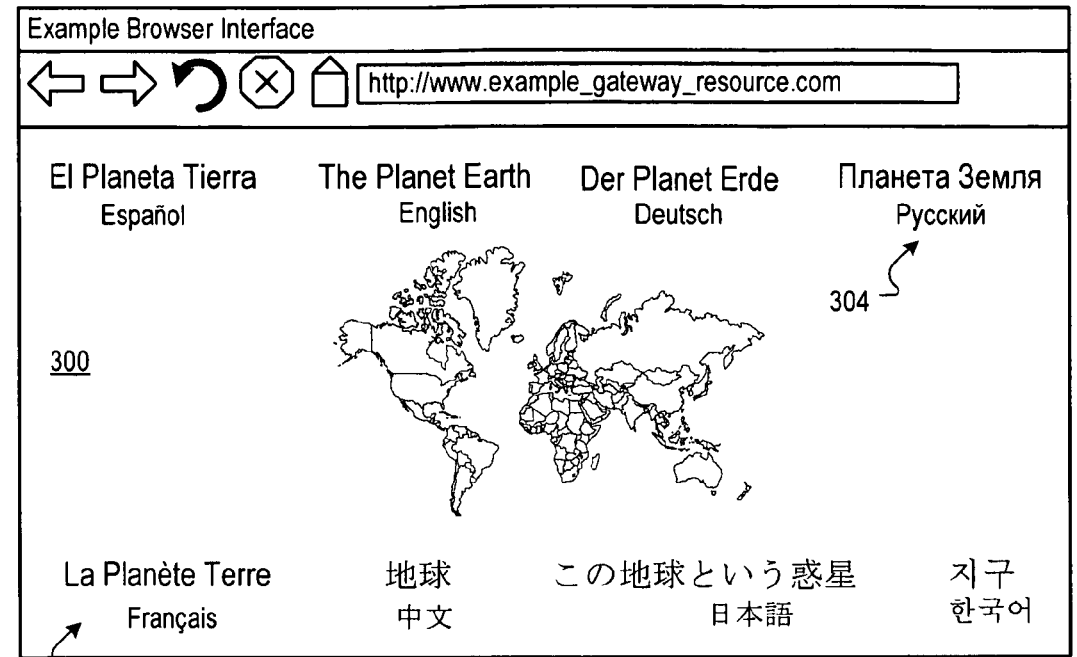
FIG. 3A is an illustration of an example language gateway resource rendered in a browser interface.
Figure 3B:
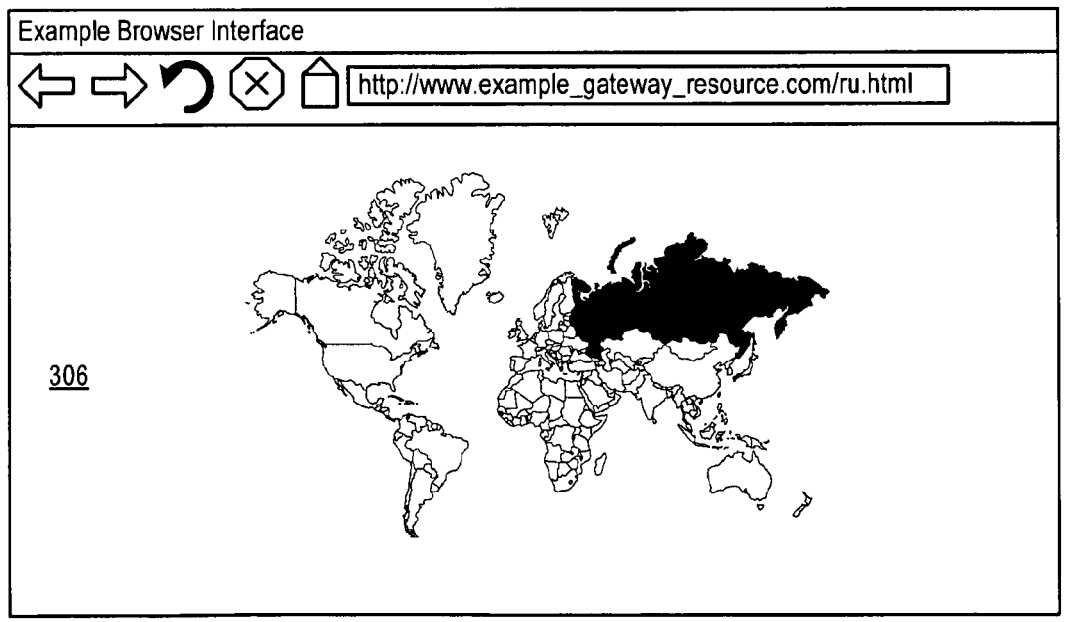
FIG. 3B is an illustration of a target resource of an outgoing link from the language gateway resource of FIG. 3A.
Figure 4:
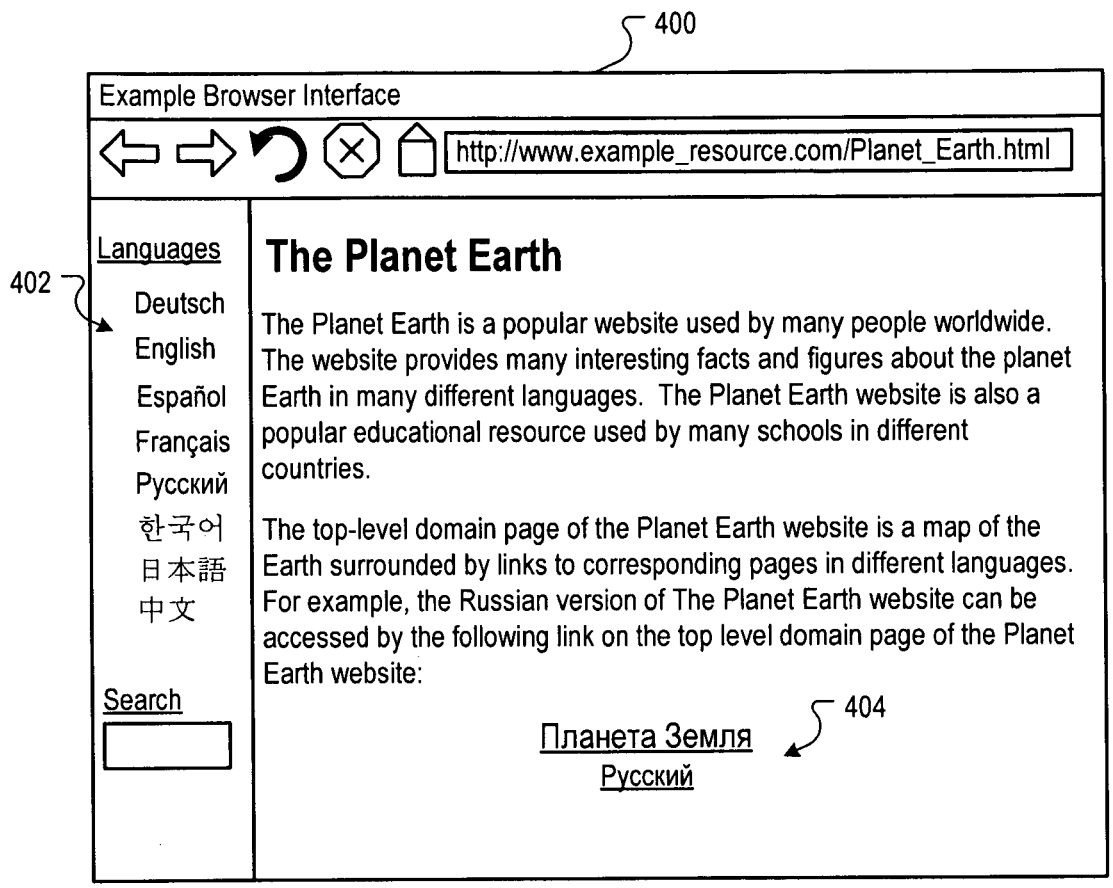
FIG. 4 is an illustration of a common resource rendered in a browser interface.

A more detailed discussion of language gateway features and link quality is provided with reference to FIGS. 3A, 3B and 4. FIG. 3A is an illustration of an example language gateway resource 300 rendered in a browser interface. The language gateway resource 300 is a top-level domain page that includes a plurality of resource links 302 that each link to duplicate resources in the corresponding languages specified by the resource links 302.

FIG. 3B is an illustration of a target resource 306 of an outgoing link from the language gateway resource of FIG. 3A. In particular, the outgoing link 304 ("Планета Земля") of FIG. 3A references the target resource 306 of FIG. 3B.

As language resource gateways are highly indicative of relevant languages for resources, the language classification model 122 is configured so that the language relevance score for an incoming link for which the source resource is a language gateway resource is greater for a particular language than if the source resource is not a language gateway resource. For example, a language relevance score for the incoming resource link 304 ("Планета Земля") to the target resource 306 indicates a higher relevance for the Russian language than for a similar resource link from a source resource that is not a language gateway resource.

This is better explained with reference to FIG. 4, which is an illustration of a common resource 400 rendered in a browser interface. A common resource is any resource that is not a language gateway resource. In the example of FIG. 4, the common resource 400 is a webpage in an online encyclopedia site. While the common resource 400 includes outgoing resource links 402 to many corresponding pages in different languages, is not the target of many incoming resource links from source resources in many different languages. Thus, the incoming resource links do not indicate at least first threshold number of languages that are relevant to the resource 400.

The link quality of the outgoing resource links can also be considered in determining the language relevance scores for the outgoing resource links. For example, in FIG. 3A, the outgoing resource links 302 are presented in a unique manner on the website www.example_gateway_resource.com, i.e., the eight outgoing resource links are presented in a large font size and in the main frame of the page. Furthermore, the presentation style of the resource links is not repeated in the same manner for other web pages within the site. This unique style of presentation can be interpreted as a signal that the resource links are highly indicative of languages that are relevant to the resource on which they are presented. For example, an author of the resource may know that the resource is the main web page of the web site that is presented to many users of many different languages, and thus may have designed the resource links to be presented prominently to the users.

Conversely, the resource links 402 in the common resource 400 are in almost all of the other resources in the encyclopedic website. Online encyclopedias pages often include resource links in a separate frame that link to pages that are a translation of the page presented. Furthermore, the resource links are always presented in the same font size and on a side frame of the resource. This common "boilerplate" style of representation can be interpreted as a signal that the resource links are only indicative of languages that are relevant to the target resources and not necessarily relevant to the resource in which they are presented. For example, most users that read only English would not select one of the outgoing resource links 402 that link to duplicate resource in a different language. Thus the language relevance scores for these links, when considered in the context of the common resource 402 for determining relevant languages for that resource, are reduced relative to other non-boilerplate links.

Finally, note that resource 400 includes an outgoing resource link 404 that references the resource 306 of FIG. 3B as a target, and is not presented in a boilerplate format. The resource link 404 is similar to the same outgoing resource link in the resource 300, and is prominently displayed. When determining the language relevance scores in the context of the resource 306, however, the language relevance system 120 will generate a higher language relevance score for the Russian language for the incoming resource link 304 than for the incoming resource link 404. This difference in the language relevance scores for the Russian language is due to the resource 300 being a language gateway resource, while the resource 400 is a common resource.

Figure 5:
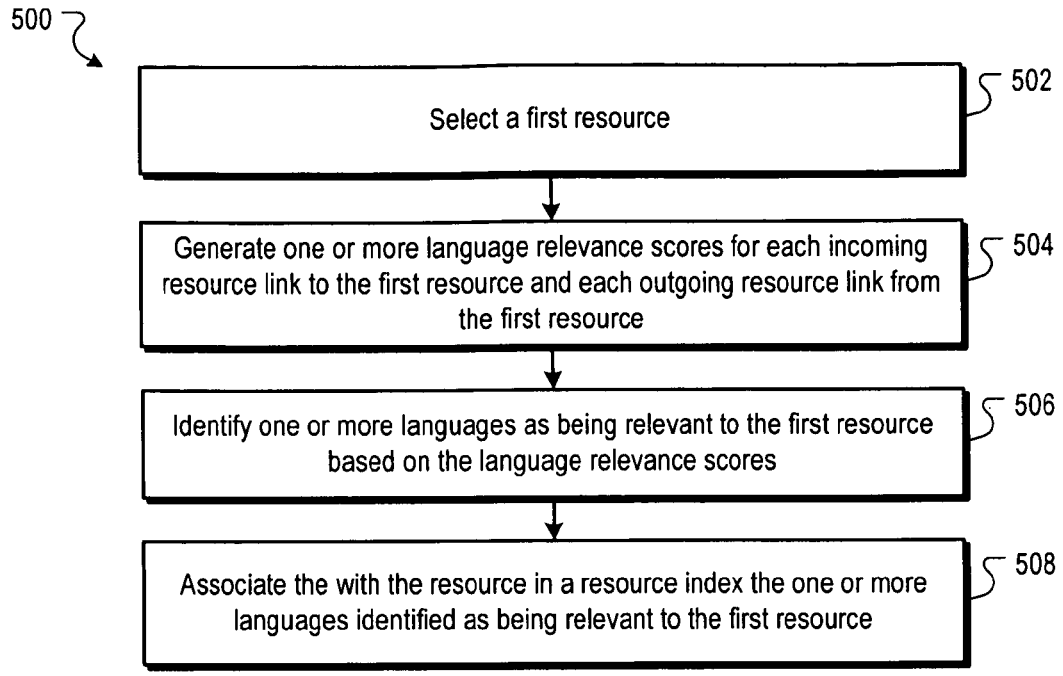
FIG. 5 is a flow diagram of an example process of identifying relevant languages for a first resource.

FIG. 5 is a flow diagram of an example process 500 of identifying relevant languages for a first resource. The process 120 can be used in a data processing apparatus that is used to realize the language relevance system 120.

A first resource is selected (502). The first resource has a corresponding resource addresses and is linked other resources by incoming resource links and outgoing resource links. Each incoming resource link links to the first resource form a corresponding source resource, and each outgoing resource link links to a corresponding target resource from the first resource.

One or more language relevance scores for each incoming resource link to the first resource and each outgoing resource link from the first resource are generated (504). The language relevance scores are generated from data defining the incoming resource links in the outgoing resource links, and each of the language relevance scores represent the relevance of a corresponding language the first resource. For example, the feature extractor 124 can identify language features associated with the resource links, such as anchor text, country codes, the content of target resources or source resources, whether the target resources or source resources are common resources or language gateway to resources, whether the resource links are directed to the same domain that hosts the first resource or a different domain, and whether incoming links are grouped according to a common source, to name just a few. These language features and then input to the language classification model to generate the language relevance scores for each resource link.

One or more languages are identified as being relevant to the first resource based on the language relevance scores (506). In some implementations, the language relevance scores of all the incoming links to the first resource and all the outgoing links from the first resource are used to generate relevant language data that measure the relevance of the first resource to the corresponding languages. The relevance measure of each corresponding language is compared to a threshold, and the relevance measure exceeds the threshold, then the corresponding language is identified as being relevant to the first resource.

The one or more languages identified as being relevant to the first resource are associated with the resource in a resource index (508). For example, the language relevance system 120 can store an association of the languages identified as being relevant to the first resource in the resource index 114. In some implementations, the associations are represented by binary values, i.e., a vector in which relevant languages are identified by a binary value of one, and languages that are determined not to be relevant are identified by binary value of zero. In other implementations, the associations of relevant languages are represented by the relevance measures derived from the language relevance scores.

Figure 6:
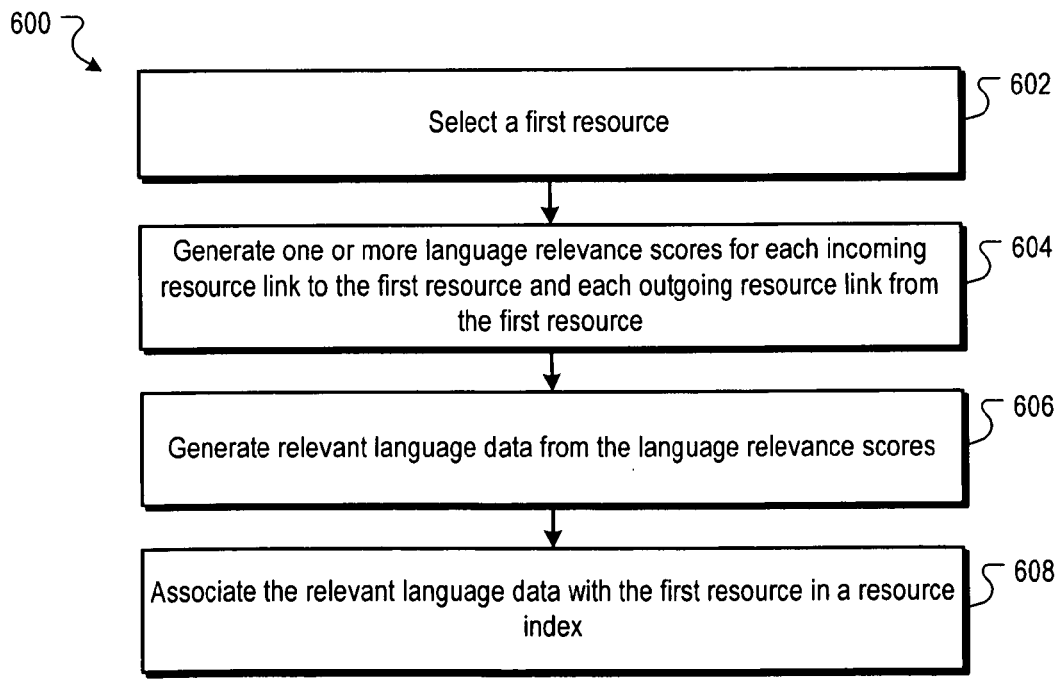
FIG. 6 is a flow diagram of an example process of determining relevance relevant language data that measure the relevance of languages to a first resource.

FIG. 6 is a flow diagram of an example process 600 of determining relevant language data that measure the relevance of languages to a first resource. The process 600 can be used in a data processing apparatus that is used to realize the language relevance system 120. The process 600 is similar to the process 500, except that the relevant language data are associated with the first resource in the resource index, i.e., no determination is made as to whether a relevance measure for corresponding language exceeds a threshold.

A first resource is selected (602), and one or more language relevance scores for each incoming resource link to the first resource and each outgoing resource link from the first resource are generated (604). The relevant language data are generated from the language relevance scores (606). The relevant language data are then associated with the first resource the resource index (608).

Figure 7:
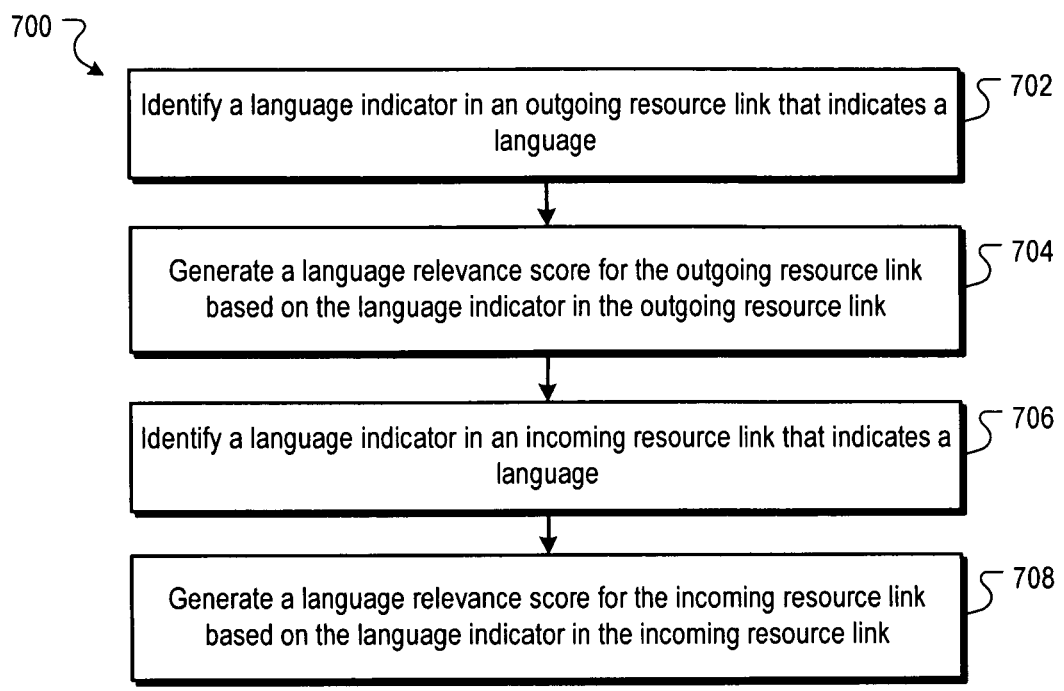
FIG. 7 is a flow diagram of an example process of generating language relevance scores for incoming resource links and outgoing resource links.

FIG. 7 is a flow diagram of an example process 700 of generating language relevance scores for incoming resource links and outgoing resource links. The process 700 can be used in a data processing apparatus that is used to realize the language relevance system 120.

A language indicator in an outgoing resource link that indicates a language is identified (702). Example language indicators include anchor text or language or country codes embedded in a URL.

A language relevance score for the outgoing resource link is generated based on language indicator in the outgoing resource link (704). For example, the feature extractor 124 may identify anchor text that specifies a particular language, and a corresponding language code that corresponds to the particular language, e.g., "English" and ".en." The presence of both of these language indicators can result in a higher language feature weight corresponding to the presence of an English language indicator in an outgoing resource link. Similarly, if only one language indicator is found, e.g., the anchor text "English," a lower feature weight corresponding to the presence of an English-language indicator in an outgoing resource link is assigned. The language classification model 122 uses the feature weights to generate a language relevance score for the outgoing link.

Similarly, a language indicator in an incoming resource link that indicates a language is identified (706), and a language relevance score for the incoming resource link is generated based on the language indicator and the incoming resource link (708). For example, the feature extractor 124 may identify anchor text that specifies a particular language, and a corresponding country code that corresponds to the particular language, e.g., "French" and ".fr." As with the outgoing links, the language classification model 122 generates the language relevance scores based on the identified language features.

In addition to using language indicators, the language relevance system 120 can also use other features associated with each of the resource links to generate the language relevance scores.

Figure 8:
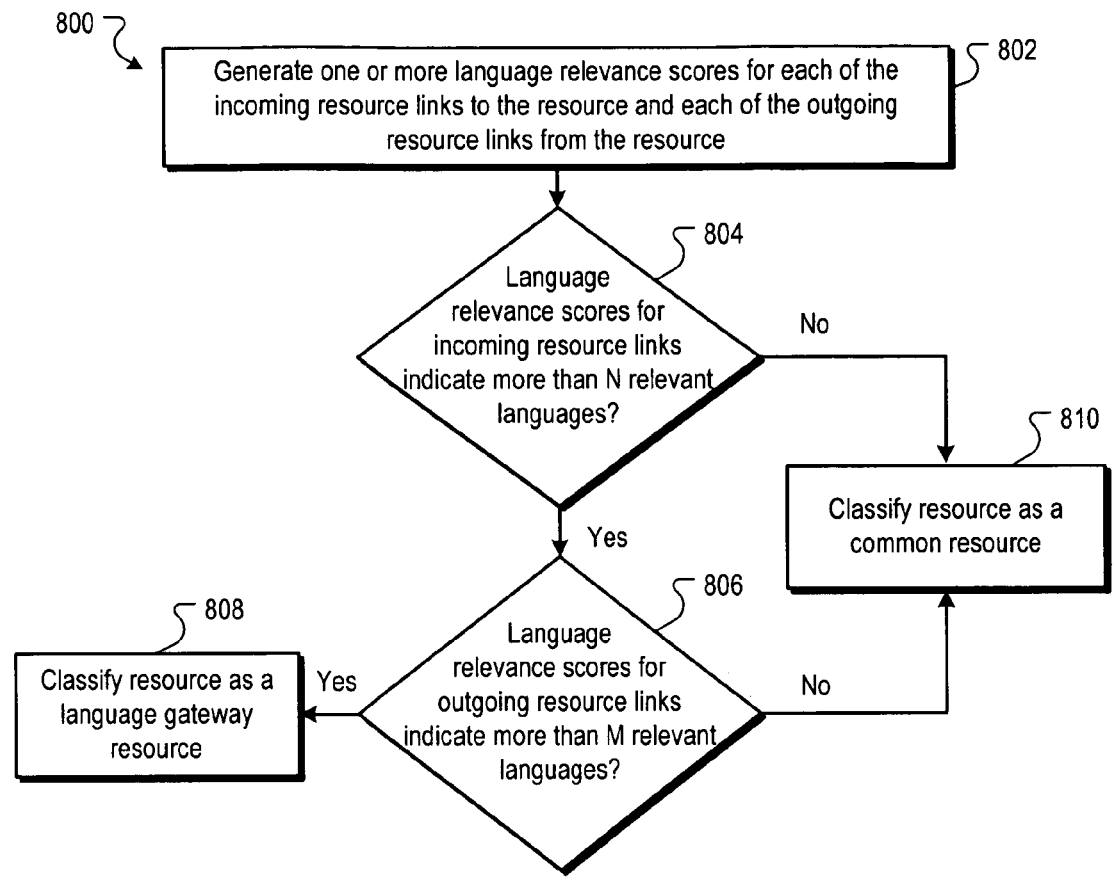
FIG. 8 is a flow diagram of an example process of identifying language gateway resources.

FIG. 8 is a flow diagram of an example process 800 of identifying language gateway resources. The process 800 can be used in a data processing apparatus that is used to realize the language relevance system 120.

One or more language relevance scores for each of the incoming resource links to the resource and each outgoing resource links from the source resource are generated (802). The language relevance scores can, for example, be generated as described above.

The language relevance scores for the incoming resource links are checked to determine whether the language relevance scores indicate more than a first threshold number (N) of relevant languages (804). For example, the language relevance scores of the incoming resource links can be compared to a first threshold relevance value. If the relevance value is exceeded, then the relevance value indicates a relevant language.

If more than a first threshold number of relevant languages for the incoming resource links are indicated by the language relevance scores, then the language relevance scores for the outgoing resource links are checked to determine whether the language relevance scores indicate more than a second threshold number of (M) relevant languages (806). For example, the language relevance scores of the outgoing resource links can be compared to a second threshold relevance value. If the relevance value is exceeded, then the relevance value indicates a relevant language.

In some implementations, the first and second threshold relevance values can be equal, as can the first and second threshold numbers. In other implementations, these values can differ.

If more than a second threshold number of relevant languages for the outgoing resource links are indicated, then the resource is classified as a language gateway resource (808). Conversely, if any of the previous threshold checks fail, then the resource is classified as a common resource (810). The classification of a resource can be stored in the resource index 112.

Figure 9:
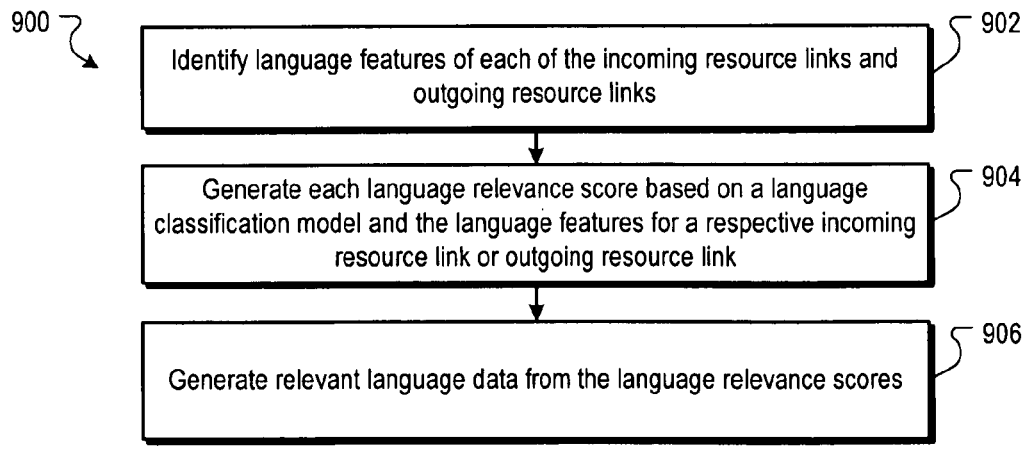
FIG. 9 is a flow diagram of an example process of generating relevant language data using a language classification model.

FIG. 9 is a flow diagram of an example process 900 of generating relevant language data using a language classification model. The process 900 can be used in a data processing apparatus that is used to realize the language relevance system 120.

Language features of each of the incoming resource links and outgoing resource links are identified (902). For example, the feature extractor 124 can identify language features of the incoming resource links and outgoing resource links for a selected resource, as described above.

Each language relevance score is generated based on a language classification model and the language features for respective incoming resource link or outgoing resource link (904). For example, the language classification model 122 can receive the language features as input to generate the language relevance scores.

The relevant language data for the resource are generated from the language relevance scores (906). For example, the language classification model 122 can use a summation function of the language relevance scores to generate the relevant language data. In other implementations, the language classification model 122 can use a multiplication of the language relevance scores to generate the language relevance data. Other functions can also be used, depending on the scoring system implemented.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method, comprising:
   selecting, by a data processing apparatus, a first resource having a corresponding first resource address and being linked to other resources by incoming resource links and outgoing resource links, each incoming resource link being a resource link that links to the first resource from a corresponding source resource, and each outgoing resource link being a resource link that links to a corresponding target resource from the first resource;
   generating, by the data processing apparatus, one or more language relevance scores for each of the incoming resource links and outgoing resource links from data defining the incoming resource links and the outgoing resource links, each of the language relevance scores representing a relevance of a corresponding language to the first resource;
   identifying, by the data processing apparatus, one or more languages as being relevant to the first resource from the language relevance scores; and
   associating with the resource in a resource index the one or more languages identified as being relevant to the first resource.

2. The computer-implemented method of claim 1, wherein generating one or more language relevance scores for each of the incoming resource links and outgoing resource links comprises:
   for each outgoing resource link:
      determining a target content language of the target resource; and
      generating a language relevance score for the outgoing resource link based on the target content language of the target resource; and
   for each incoming resource link:
      determining a source content language of the source resource; and
      generating a language relevance score for the incoming resource link based on the source content language of the source resource.

3. The computer-implemented method of claim 1, wherein generating one or more language relevance scores for each of the incoming resource links and outgoing resource links comprises:
   identifying a language indicator in an outgoing resource link that indicates a language;

generating a language relevance score for the outgoing resource link based on the language indicator in the outgoing resource link;

identifying a language indicator in an incoming resource link that indicates a language; and generating a language relevance score for the incoming resource link based on the language indicator in the incoming resource link.

4. The computer-implemented method of claim 3, wherein the language indicator is anchor text that specifies a language.

5. The computer-implemented method of claim 3, wherein the language indicator is a country code in an embedded uniform resource locator.

6. The computer-implemented method of claim 1, wherein generating one or more language relevance scores for each of the incoming resource links and outgoing resource links comprises:

determining a link quality for each of the incoming resource links and outgoing resource links; and generating the one or more language relevance scores for each of the incoming resource links and outgoing resource links based in part on the link quality of each resource link.

7. The computer-implemented method of claim 1, wherein the language relevance score for an incoming resource link indicates a higher relevance of a language to the resource if the source resource is a language gateway resource than if the source resource is not a language gateway resource.

8. The computer-implemented method of claim 1, further comprising, for a source resource including incoming resource links to the source resource and outgoing resource links from the source resource:

generating in the data processing apparatus one or more language relevance score for each of the incoming resource links to the source resource and each of the outgoing source resource links from the source resource;

determining in the data processing apparatus that the source resource is a language gateway resource if the language relevance scores for the incoming resource links indicate at least first threshold number of languages that are relevant to the source resource and the language relevance scores for the outgoing resource links indicate at least second threshold number of languages that are relevant to the source resource; and wherein the language relevance score for an incoming resource link indicates a higher relevance of a language to the resource if the source resource is a language gateway resource than if the source resource is not a language gateway resource.

9. The computer-implemented method of claim 8, wherein the selection of outgoing resource links from the source resource comprises selecting only outgoing resource links that link to target resources having resource addresses that are within a same domain as the first resource address of the source resource.

10. The computer-implemented method of claim 1, wherein identifying one or more languages as being relevant to the first resource based on the language relevance scores comprises, for each of a plurality of languages:

determining a likelihood that the language is relevant to the first resource; and identifying the language as relevant to the first resource if the likelihood exceeds a minimum threshold.

11. The computer-implemented method of claim 1, wherein generating a language relevance score for each of the incoming resource links and outgoing resource links comprises:

identifying a plurality of language features that are present for each of the incoming resource links and outgoing resource links; and generating each language relevance score based on the plurality of language features for a respective incoming resource link or outgoing resource link and a language classification model that uses the plurality of language features as input to generate the language relevance score.

12. The computer-implemented method of claim 11, wherein the language classification model is a Naïve Bayes classification model.

13. The computer-implemented method of claim 11, further comprising:

selecting in the data processing apparatus a training set of resources, the training set of resources having associated relevant language training data that specify relevant languages for each resource in the training set;

selecting in the data processing apparatus a test set of resources, the test set of resources having associated relevant language training data that specify relevant languages for each resource in the test set; and training in the data processing apparatus the language classification model on a plurality of feature weights for each of the incoming resource links and outgoing resource links in the training set and testing the plurality of feature weights in the language classification model on the language features for each of the incoming resource links and outgoing resource links in the testing set until the language classification model identifies at least threshold number of the relevant languages for the first resources in the testing set.

14. A system, comprising:

a data processing apparatus;

a data store storing instruction executable by the data processing apparatus and upon execution by the data processing apparatus cause the data processing apparatus to perform operations comprising:

selecting a first resource having a corresponding resource address and being linked to other resources by incoming resource links and outgoing resource links, each incoming resource link being a resource link that links to the first resource from a corresponding source resource, and each outgoing resource link being a resource link that links to a corresponding target resource from the first resource;

generating language relevance scores for each of the incoming resource links and outgoing resource links from data defining the incoming resource links and the outgoing resource links, each of the language relevance scores representing a relevance of a corresponding language to the first resource;

generating relevant language data from the language relevance scores, the relevant language data being data that measure the relevance to the first resource to the corresponding languages; and associating the relevant language data with the first resource in a resource index.

15. The system of claim 14, wherein generating one or more language relevance scores for each of the incoming resource links and outgoing resource links comprises:

for each outgoing resource link:

determining a target content language of the target resource; and generating a language relevance score for the outgoing resource link based on the target content language of the target resource; and for each incoming resource link:
  determining a source content language of the source resource; and
  generating a language relevance score for the incoming resource link based on the source content language of the source resource.

16. The system of claim 14, wherein generating one or more language relevance score for each of the incoming resource links and outgoing resource links from data defining the incoming resource links and the outgoing resource links comprises:
  identifying a language indicator in an outgoing resource link that indicates a language;
  generating a language relevance score for the outgoing resource link based on the language indicator in the outgoing resource link;
  identifying a language indicator in an incoming resource link that indicates a language; and
  generating a language relevance score for the incoming resource link based on the language indicator in the incoming resource link.

17. The system of claim 14, wherein the language relevance score for an incoming resource link indicates a higher relevance of a language to the resource if the source resource is a language gateway resource than if the source resource is not a language gateway resource.

18. The system of claim 14, wherein the operations further comprise:
  for a source resource including incoming resource links to the source resource and outgoing resource links from the source resource:
    generating one or more language relevance score for each of the incoming resource links to the source resource and each of the outgoing source resource links from the source resource;
    determining that the source resource is a language gateway resource if the language relevance scores for the incoming resource links indicate at least first threshold number of languages that are relevant to the source resource and the language relevance scores for the outgoing resource links indicate at least second threshold number of languages that are relevant to the source resource; and
  wherein the language relevance score for an incoming resource link indicates a higher relevance of a language to the resource if the source resource is a language gateway resource than if the source resource is not a language gateway resource.

19. The system of claim 14, wherein generating relevant language data from the language relevance scores, the relevant language data being data that measures the relevance to the first resource to the corresponding languages comprises generating a language relevance vector, the language relevance vector including a plurality of relevance measures corresponding to a plurality of languages, each relevance measure being a measure of a relevance of its corresponding language to the resource.

20. A system, comprising:
  a resource index stored in a persistent storage device, the resource index storing an index of a plurality of resources; and
  a language relevance system data processing apparatus that performs operations comprising:
    selecting a first resource indexed by the resource index, the resource having a corresponding resource address and being linked to other resources by incoming resource links and outgoing resource links, each incoming resource link being a resource link that links to the first resource from a corresponding source resource, and each outgoing resource link being a resource link that links to a corresponding target resource from the first resource;
    generating one or more language relevance scores for each of the incoming resource links and outgoing resource links from data defining the incoming resource links and the outgoing resource links, each of the language relevance scores representing a relevance of a corresponding language to the first resource;
    identifying one or more languages as being relevant to the first resource based on the language relevance scores; and
    associating the identified one or more languages with the first resource in the resource index.

21. The system of claim 20, wherein the language relevance system includes a language classification model configured to apply feature weights to a plurality of language features; and
  wherein generating a language relevance score for each of the incoming resource links and outgoing resource links comprises:
    identifying a plurality of language features that are present for each of the incoming resource links and outgoing resource links; and
    generating each language relevance score based on the language classification model and the identified language features for a respective incoming resource link or outgoing resource link.

* * * * *